US012600496B2

(12) United States Patent
Yost

(10) Patent No.: US 12,600,496 B2
(45) Date of Patent: Apr. 14, 2026

(54) SYSTEM AND METHOD FOR A SPACECRAFT DOCKING STATION

(71) Applicant: Thomas F. Yost, Chesapeake Beach, MD (US)

(72) Inventor: Thomas F. Yost, Chesapeake Beach, MD (US)

( * ) Notice: Subject to any disclaimer, the term of this patent is extended or adjusted under 35 U.S.C. 154(b) by 114 days.

(21) Appl. No.: 18/663,355

(22) Filed: May 14, 2024

(65) Prior Publication Data

US 2024/0375797 A1    Nov. 14, 2024

Related U.S. Application Data

(60) Provisional application No. 63/466,327, filed on May 14, 2023.

(51) Int. Cl.
| | |
|---|---|
| *B64G 1/00* | (2006.01) |
| *B64B 1/08* | (2006.01) |
| *B64B 1/30* | (2006.01) |
| *B64G 1/40* | (2006.01) |
| *B64G 1/64* | (2006.01) |
| *B64G 4/00* | (2006.01) |

(52) U.S. Cl.
CPC ................ *B64G 1/005* (2013.01); *B64B 1/08* (2013.01); *B64B 1/30* (2013.01); *B64G 1/008* (2023.08); *B64G 1/40* (2013.01); *B64G 1/6462* (2023.08); *B64G 4/00* (2013.01); *B64G 2004/005* (2013.01)

(58) Field of Classification Search
CPC .......... B64G 1/005; B64G 1/008; B64G 1/40;

B64G 1/6462; B64G 4/00; B64G 2004/005; B64B 1/08; B64B 1/30; B64B 1/22; B64B 1/40; B64B 1/58; B64B 1/62
See application file for complete search history.

(56) References Cited

U.S. PATENT DOCUMENTS 4,730,797 A * 3/1988 Minovitch ............. B64G 99/00
                                                            244/158.3
6,299,107 B1 * 10/2001 Kong ..................... B64G 1/646
                                                            244/172.4

FOREIGN PATENT DOCUMENTS

CN        114435634 A      5/2022

OTHER PUBLICATIONS

Corresponding PCT/US2024/029228. International Search Report & Written Opinion (Sep. 4, 2024).

* cited by examiner

*Primary Examiner* — Valentina Xavier
(74) *Attorney, Agent, or Firm* — Jessica Smith; LOZA & LOZA, LLP

(57)            ABSTRACT

A spacecraft docking station is adapted to facilitate docking of spacecraft within outer space. According to one example, a spacecraft docking station may include a frame enclosing an area, and a net-like mesh coupled to the frame and filling the area enclosed by the frame. An autonomous robot may be coupled to the net-like mesh. One or more vessels may be coupled to the frame and/or the net-like mesh, where the one or more vessels include a propulsion mechanism. Other aspects, embodiments, and features are also included.

19 Claims, 4 Drawing Sheets

SYSTEM AND METHOD FOR A SPACECRAFT DOCKING STATION

CROSS REFERENCE TO RELATED APPLICATIONS

The present application claims priority under 35 U.S.C. § 119 to U.S. Provisional Application No. 63/466,327 entitled, "SPACE CARGO DIRIGIBLE AND LAUNCHER," filed May 14, 2023, and hereby expressly incorporated by reference herein.

U.S. patent application Ser. No. 18/663,335 filed May 14, 2024 entitled, "SYSTEM AND METHOD FOR A SUPERCONDUCTIVE, ELECTROMAGNETIC LAUNCHER", by inventor Thomas F. Yost, the entirety of which is incorporated by reference herein.

U.S. patent application Ser. No. 18/664,116 filed May 14, 2024 entitled, "SYSTEM AND METHOD FOR DIMPLED SPHERICAL STORAGE UNITS," by inventor Thomas F. Yost, the entirety of which is incorporated by reference herein.

U.S. patent application Ser. No. 18/664,170, filed May 14, 2024 entitled, "SYSTEM AND METHOD FOR SMART SPHERICAL CLUSTER VESSELS," by inventor Thomas F. Yost, the entirety of which is incorporated by reference herein.

U.S. patent application Ser. No. 18/663,365, filed May 14, 2024 entitled, "SYSTEM AND METHOD FOR A STRATOSHPERIC AIRCRAFT," by inventor Thomas F. Yost, the entirety of which is incorporated by reference herein.

FIELD

This application relates to systems and methods for a spacecraft and more specifically, a docking station for cargo containers and other spacecraft in space.

BACKGROUND

Systems and devices used in space to facilitate space travel, exploration and construction are continuously being researched and developed for various purposes. As spacecraft travel through space, it may be beneficial to provide docking stations for various purposes. Accordingly, improvements and developments of spacecraft docking stations may be desirable.

SUMMARY

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Various examples and implementations of the present disclosure facilitate spacecraft docking in outer space. In at least one aspect of the present disclosure, spacecraft docking stations are provided. In at least one example, a spacecraft docking station may include a frame enclosing an area, and a net-like mesh coupled to the frame and filling the area enclosed by the frame.

Additional examples of a spacecraft docking station may include a frame enclosing an area. A plurality of wires may be coupled to the frame, where the plurality of wires are interconnected to form a net-like mesh filling the area enclosed by the frame. An autonomous robot may be coupled to the net-like mesh.

Further aspects provide methods of making a spacecraft docking station. One or more examples of such methods may include forming a frame to enclose an area. A plurality of wires may be coupled to the frame, where the plurality of wires are interconnected to form a net-like mesh filling the area enclosed by the frame.

These and other aspects of the disclosure will become more fully understood upon a review of the detailed description which follows. Other aspects, features, and examples of the present invention will become apparent to those of ordinary skill in the art, upon reviewing the following description of specific, exemplary examples in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples of the invention discussed herein. In similar fashion, while exemplary examples may be discussed below as device, system, or method examples it should be understood that such exemplary examples can be implemented in various devices, systems, and methods.

DETAILED DESCRIPTION

The word "exemplary" or "embodiment" is used herein to mean "serving as an example, instance, or illustration." Any implementation or aspect described herein as "exemplary" or as an "embodiment" is not necessarily to be construed as preferred or advantageous over other aspects of the disclosure. Likewise, the term "aspects" does not require that all aspects of the disclosure include the discussed feature, advantage, or mode of operation.

Embodiments will now be described in detail with reference to the accompanying drawings. In the following description, numerous specific details are set forth in order to provide a thorough understanding of the aspects described herein. It will be apparent, however, to one skilled in the art, that these and other aspects may be practiced without some or all of these specific details. In addition, well known steps in a process may be omitted from flow diagrams and descriptions presented herein in order not to obscure the aspects of the disclosure. Similarly, well known components in a device or well-known systems may be omitted from figures and descriptions thereof presented herein in order not to obscure the aspects of the disclosure.

Figure 1:
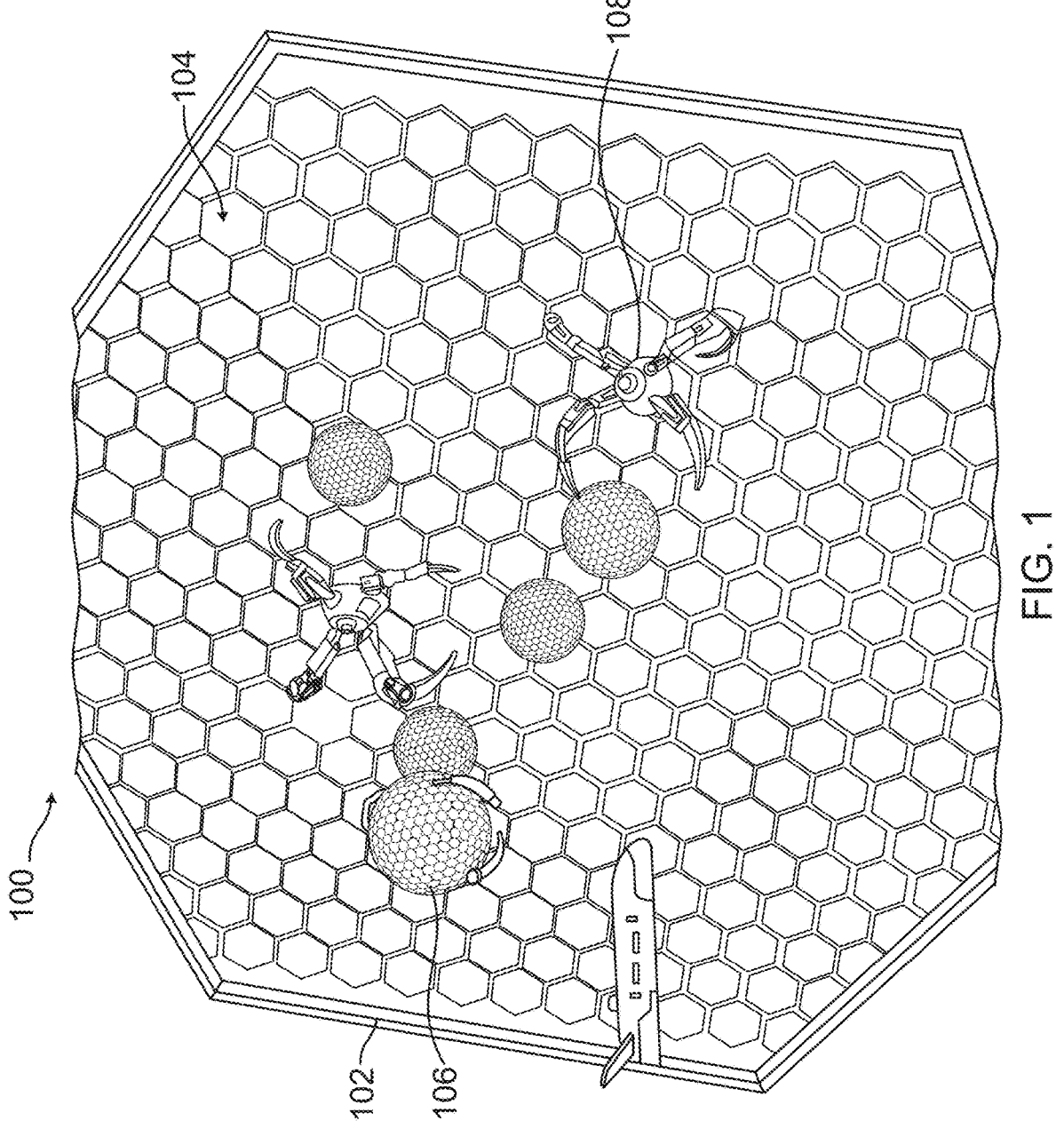
FIG. 1 is an isometric view of a spacecraft docking station according to at least one embodiment.

FIG. 1 is an isometric view of a spacecraft docking station 100 according to at least one embodiment. As shown, the spacecraft docking station 100 may include a frame 102 with a net-like mesh 104 coupled to the frame 102 and filling in an area enclosed by the frame 102. The frame 102 may be formed in various shapes. In the embodiment shown, the frame 102 has a hexagonal shape. By way of example and not limitation, the frame may be formed with sides of equal length. For example, each side may be 40 meters. Although a hexagonal shape is shown, it will be apparent to those of ordinary skill in the art that the frame 102 may be other desired shapes, such as circular, square, rectangular, octagonal, triangular, etc.

The net-like mesh 104 may be formed from a plurality of individual wires or wound wires. The individual or wound wires may be formed with an electrically conductive and magnetic material. The net-like mesh 104 may be formed with a geometric pattern with the openings in the mesh being sized and shaped to inhibit the passing of spacecraft through the mesh 104. In the example depicted, the mesh 104 is formed with a hexagonal (e.g., chicken wire) shape. Other shapes may include square, triangular, rectangular, oblong, etc. According to at least one embodiment, the openings in the mesh 104 are sized and shaped to inhibit spherical spacecraft vessels 106 having a diameter of 5 meters from passing through the mesh 104.

In operation, the docking station 100 may receive spacecrafts of various shapes and sizes. As depicted, at least one embodiment of a spacecraft may include ferromagnetic shelled vessels 106, an embodiment of which is described in U.S. patent application Ser. No. 18/664,116, filed May 14, 2024, entitled, "SYSTEM AND METHOD FOR DIMPLED SPHERICAL STORAGE UNITS," by inventor Thomas Yost, the entirety of which is incorporated by reference herein. The magnetic net-like mesh 104 can hold the vessel 106 (or other metallic spacecraft) to the net-like mesh 104 to keep the vessel 106 in place. With a vessel 106 coupled with the net-like mesh 104, maintenance can be performed on the vessel 106, and/or the vessel 106 can provide needed aid to other spacecraft (e.g., fuel, repair parts, provisions, tools, etc.) to facilitate further travel from the docking station 100.

Figure 2:
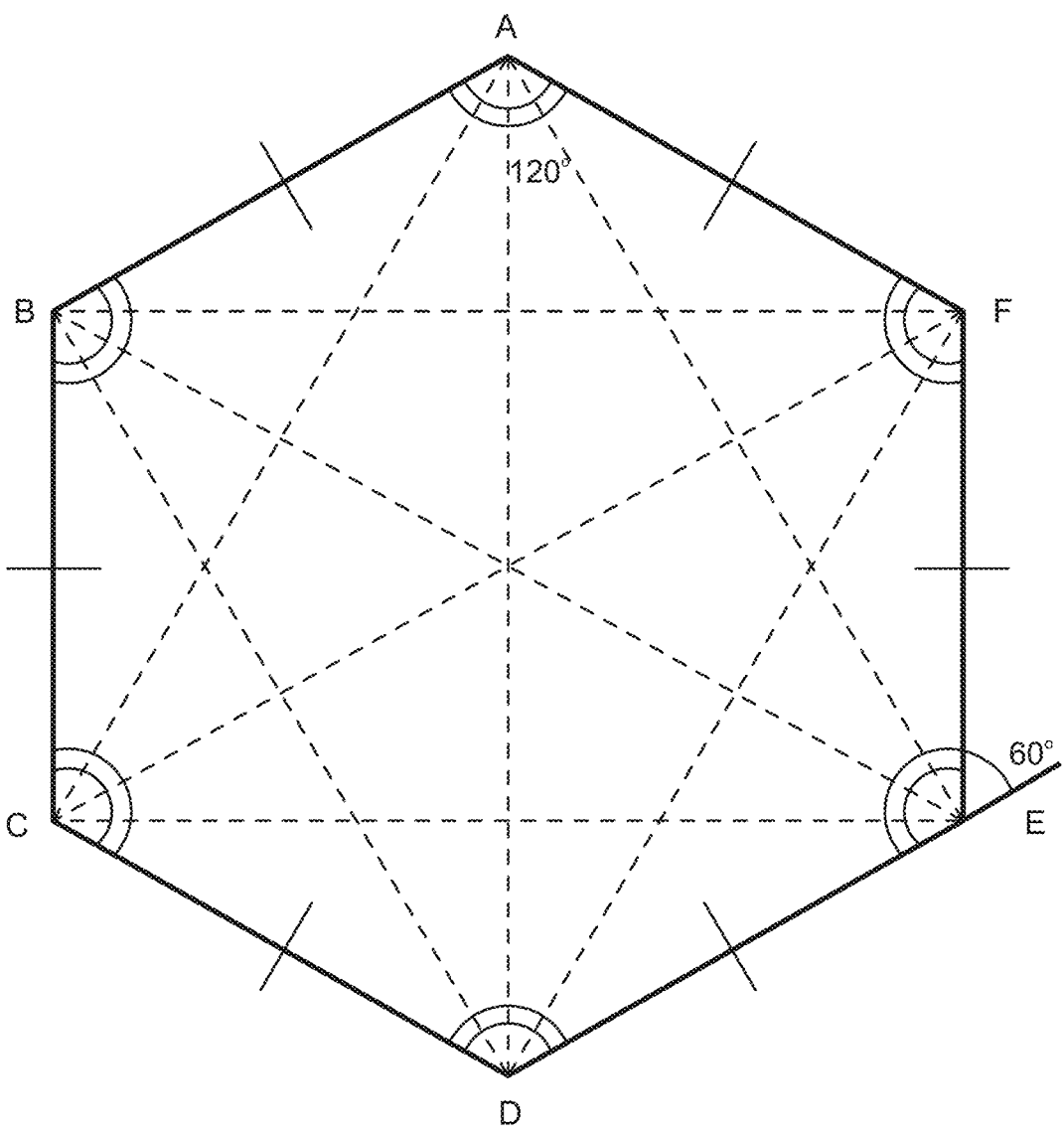
FIG. 2 is a schematic diagram of a docking station according to at least one embodiment.

In some embodiments, the docking station 100 may further include a propulsion mechanism to facilitate location and orbit maintenance of the docking station 100. For example, a plurality of vessels 106 may be positioned on the docking station 100, where each vessel 106 provides propulsion. Referring to FIG. 2, a schematic diagram is shown for a docking station 100 formed as a hexagon. In one or more such embodiments, the vessels 106 may be positioned at corners relative to each other to form a rectangle within the hexagon. For example, a respective vessel 106 may be positioned at each point B, F, C, and E in FIG. 2 to provide thrust to the docking station 100 as needed.

In various implementations, the docking station 100 may be positioned in orbit where desired. In at least one implementation, the docking station 100 may be positioned in orbit at 51.6° to match the International Space Station (ISS), which can facilitate providing supplies and oxygen to the ISS. In at least another implementation, a docking station 100 may be positioned at 0° on the equator in a geosynchronous orbit, to facilitate reception of one or more vessels 106 launched from the upper stratosphere toward the docking station 100.

Figure 3:
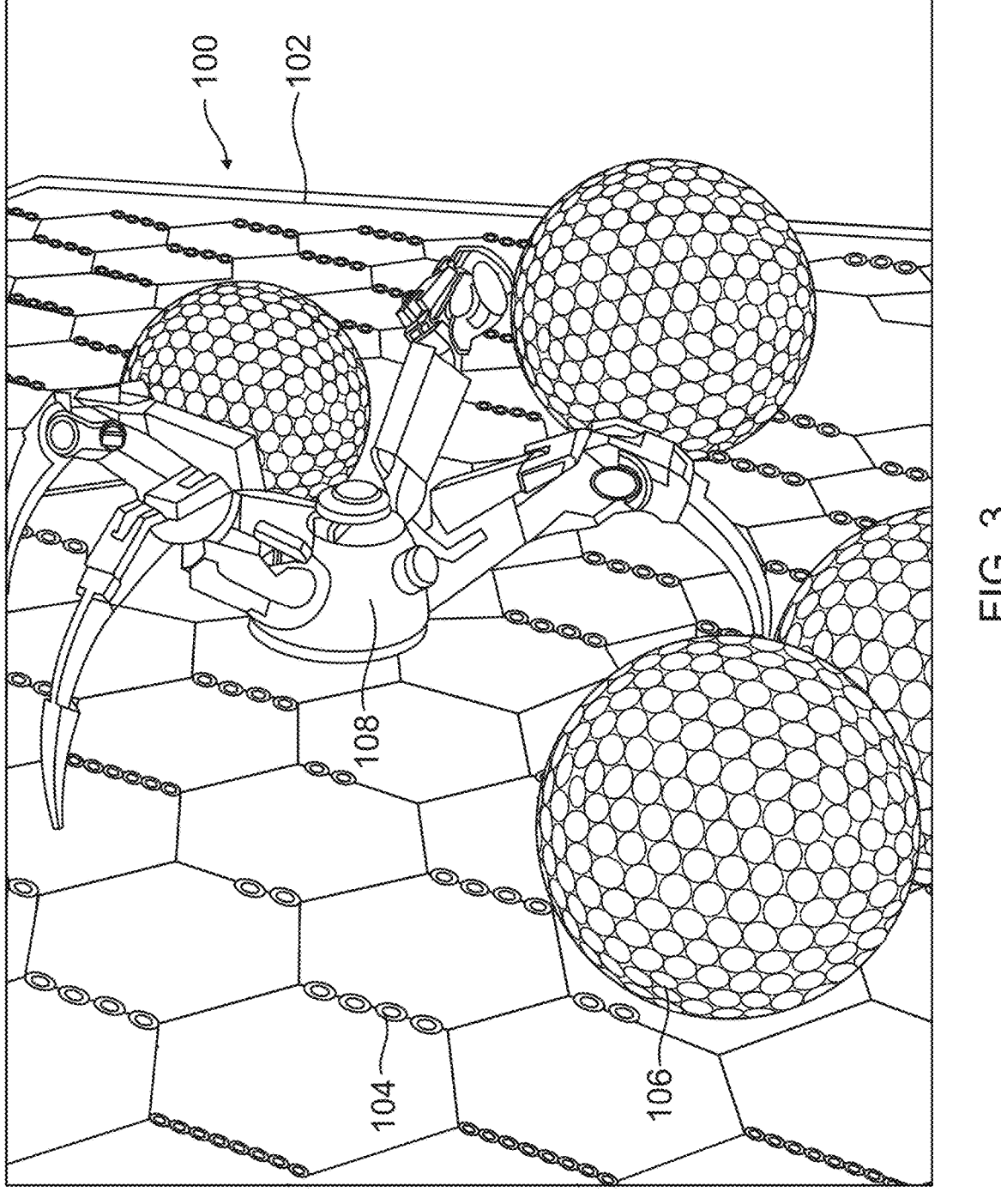
FIG. 3 is a close-up isometric view of a docking station according to at least one example.

Referring back to FIG. 1, according to various aspects of the disclosure, the docking station 100 may further include at least one robot 108. The robot 108 may be autonomous to help manage spacecraft at the docking station 100. FIG. 3 is a close-up isometric view of the docking station 100 illustrating a robot 108 and several vessels 106 stationed at the docking station 100. As shown, the robot 108 may comprise a spider-shaped body with several legs extending from a central body. With an electrical current running through the net-like mesh 104, an electromagnetic effect can maintain the robot 108 attached to the net-like mesh 104, as well as the vessels 106. As depicted in FIG. 3, the robot 108 can aid the vessels 106 in attaching to the mesh 104. Using several vessels 106, the robot 108 may also arrange the vessels together in a cluster or lattice structure to form a larger spacecraft, an embodiment of which is described in U.S. patent application Ser. No. 18/664,170, filed May 14, 2024, entitled, "SYSTEM AND METHOD FOR SMART SPHERICAL CLUSTER VESSELS," by inventor Thomas Yost, the entirety of which is incorporated by reference herein.

Figure 4:
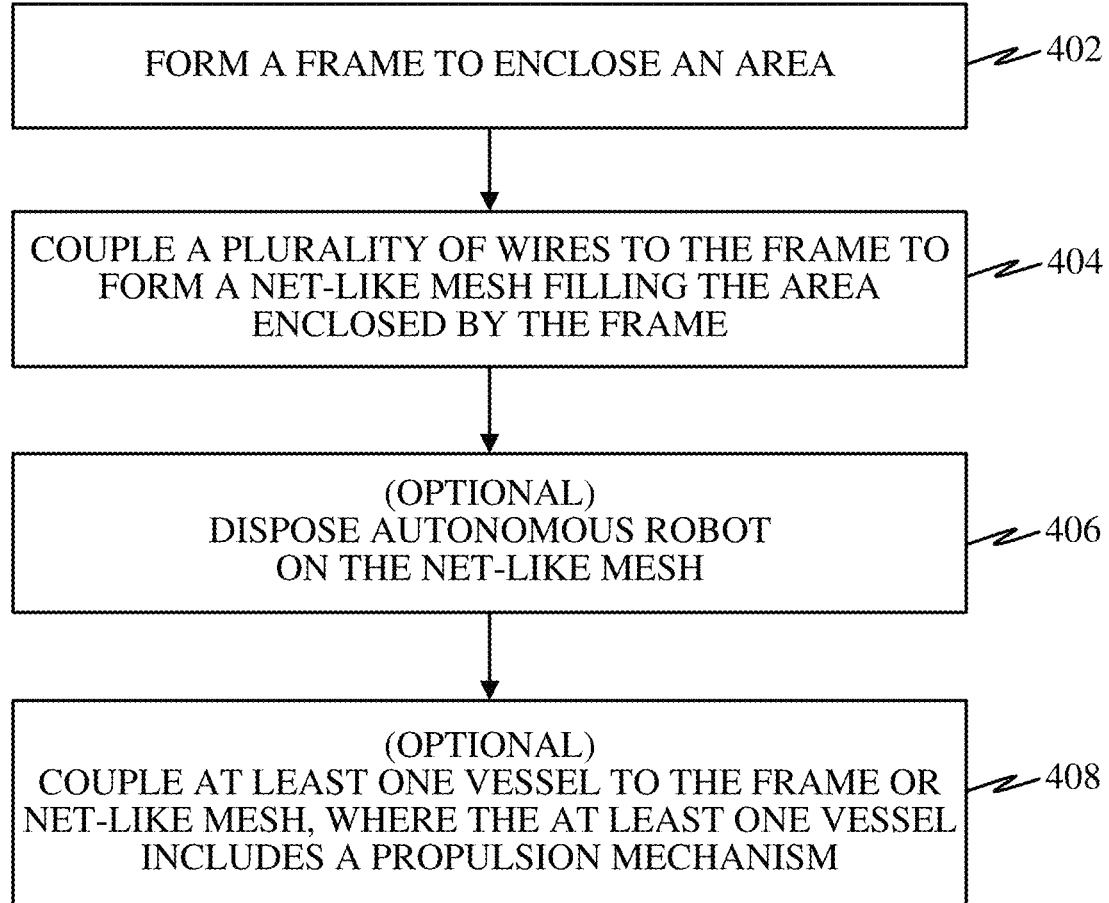
FIG. 4 is a flow diagram depicting an example of a method of making a docking station according to at least one implementation.

Additional aspects of the present disclosure include methods of making a docking station, such as the docking station 100. FIG. 4 is a flow diagram depicting a method of making a docking station according to at least one implementation. With reference to FIGS. 1-4, a frame 102 may be formed to enclose an area at 402. The frame 102 may be formed in any of a plurality of various shapes. As discussed herein, frame 102 may be formed in geometric shape having all sides with an equal length, according to some embodiments. In various embodiments, the frame 102 may be formed with a shape of a hexagon, circle, square, rectangle, octagon, triangle, etc.

At 404, a plurality of wires may be coupled to the frame 102 to form a net-like mesh 104 filling the area enclosed by the frame 102. As discussed herein above, the plurality of wires may be individual wires and/or wound wires. The individual or wound wires may be formed with an electrically conductive and/or magnetic material. The net-like mesh 104 may be formed with a geometric pattern with the openings in the mesh being sized and shaped to inhibit the passing of spacecraft through the mesh 104. By way of example, and not limitation, the mesh 104 may be formed with a pattern of shapes selected from a hexagon, square, triangle, rectangle, or oblong shape.

According to some implementations, the method may further include an optional step at 406 of disposing an autonomous robot 108 onto the net-like mesh 104. As described herein, the robot 108 may comprise a spider-shaped body with several legs extending from a central body, and may be coupled to the net-like mesh 104 by an electromagnetic effect.

In some implementations, at step 408, one or more vessels 106 may also be coupled to the frame 102 and/or the net-like mesh 104, where the one or more vessels 106 include a propulsion mechanism.

As may be used herein, the term "operable to" or "configurable to" indicates that an element includes one or more of components, dimensions, circuits, instructions, modules, data, input(s), output(s), etc., to perform one or more of the described or necessary corresponding functions and may further include inferred coupling to one or more other items to perform the described or necessary corresponding functions. As may also be used herein, the term(s) "coupled," "coupled to," "connected to" and/or "connecting" or "interconnecting" includes direct connection or link between components or between nodes/devices and/or indirect connection between components or nodes/devices via an intervening item. As may further be used herein, inferred connections (i.e., where one element is connected to another element by inference) includes direct and indirect connection between two items in the same manner as "connected to." As may be used herein, the terms "substantially" and "approximately" provides an industry-accepted tolerance for its corresponding term and/or relativity between items.

Note that the aspects of the present disclosure may be described herein as a process that is depicted as a schematic, a flow chart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

The various features of the disclosure described herein can be implemented in different systems and devices without departing from the disclosure. It should be noted that the foregoing aspects of the disclosure are merely examples and are not to be construed as limiting the disclosure. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

In the foregoing specification, certain representative aspects have been described with reference to specific examples. Various modifications and changes may be made, however, without departing from the scope of the present invention as set forth in the claims. The specification and figures are illustrative, rather than restrictive, and modifications are intended to be included within the scope of the claims. Accordingly, the scope of the claims should be determined by the descriptions herein and their legal equivalents rather than by merely the examples described. For example, the components and/or elements recited in any apparatus claims may be assembled or otherwise operationally configured in a variety of permutations and are accordingly not limited to the specific configuration recited in the claims.

Furthermore, certain benefits, other advantages and solutions to problems have been described above with regard to particular embodiments; however, any benefit, advantage, solution to a problem, or any element that may cause any particular benefit, advantage, or solution to occur or to become more pronounced are not to be construed as critical, required, or essential features or components of any or all the claims.

As used herein, the terms "comprise," "comprises," "comprising," "having," "including," "includes" or any variation thereof, are intended to reference a nonexclusive inclusion, such that a process, method, article, composition or apparatus that comprises a list of elements does not include only those elements recited, but may also include other elements not expressly listed or inherent to such process, method, article, composition, or apparatus. Other combinations and/or modifications of the above-described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the same.

Moreover, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is intended to be construed under the provisions of 35 U.S.C. § 112(f) as a "means-plus-function" type element, unless the element is expressly recited using the phrase "means for" or, in the case of a method claim, the element is recited using the phrase "step for."

The invention claimed is:

1. A spacecraft docking station, comprising:
a frame enclosing an area; and
a net-like mesh coupled to the frame and filling the area enclosed by the frame, wherein the net-like mesh comprises a plurality of interconnected wires that are electrically conductive and magnetic.

2. The spacecraft docking station of claim 1, further comprising:
an autonomous robot coupled to the net-like mesh.

3. The spacecraft docking station of claim 2, wherein the autonomous robot is electromagnetically coupled to the net-like mesh.

4. The spacecraft docking station of claim 1, wherein the frame forms a shape selected from one of a hexagon, circle, square, rectangle, octagon, or triangle.

5. The spacecraft docking station of claim 1, wherein the plurality of interconnected wires form a pattern filling the area enclosed by the frame.

6. The spacecraft docking station of claim 5, wherein the plurality of interconnected wires form a pattern of shapes selected from one of a hexagon, square, triangle, rectangle, or oblong shape.

7. The spacecraft docking station of claim 1, further comprising at least one vessel coupled to the frame or net-like mesh, the at least one vessel including a propulsion mechanism.

8. A spacecraft docking station, comprising:
a frame enclosing an area;
a plurality of wires coupled to the frame, the plurality of wires interconnected to form a net-like mesh filling the area enclosed by the frame, wherein the plurality of wires are electrically conductive and magnetic; and
an autonomous robot coupled to the net-like mesh.

9. The spacecraft docking station of claim 8, wherein the frame comprises a shape selected from one of a hexagon, circle, square, rectangle, octagon, or triangle.

10. The spacecraft docking station of claim 8, wherein the net-like mesh comprises a pattern of shapes selected from one of a hexagon, square, triangle, rectangle, or oblong shape.

11. The spacecraft docking station of claim 8, wherein the station is positioned in a geosynchronous orbit.

12. A method of making a spacecraft docking station, comprising:
forming a frame to enclose an area;
coupling a plurality of electrically conductive and magnetic wires to the frame to form a net-like mesh filling the area enclosed by the frame.

13. The method of claim 12, further comprising:

disposing an autonomous robot on the net-like mesh.

14. The method of claim 13, wherein the autonomous robot is electromagnetically coupled to the net-like mesh.

15. The method of claim 12, wherein forming the frame comprises:

forming the frame with a shape selected from one of a hexagon, circle, square, rectangle, octagon, or triangle.

16. The method of claim 12, wherein coupling the plurality of electrically conductive and magnetic wires to the frame to form the net-like mesh filling the area enclosed by the frame comprises:

coupling the plurality of electrically conductive and magnetic wires to the frame to form a net-like mesh exhibiting a pattern of shapes selected from one of a hexagon, square, triangle, rectangle, or oblong shape.

17. The method of claim 12, further comprising:

coupling at least one vessel to the frame or to the net-like mesh, the at least one vessel including a propulsion mechanism.

18. The method of claim 12, further comprising:

electromagnetically coupling at least one vessel to the frame and/or to the net-like mesh, the at least one vessel including a propulsion mechanism.

19. The method of claim 12, further comprising:

electromagnetically coupling an autonomous robot to the frame and/or to the net-like mesh.

* * * * *